United States Patent [19]

Smith, II

[11] Patent Number: 5,244,570
[45] Date of Patent: Sep. 14, 1993

[54] APPARATUS FOR TREATING WASTEWATER

[75] Inventor: J. Edward Smith, II, Charlotte, N.C.

[73] Assignee: Champion International Corporation, Stamford, Conn.

[21] Appl. No.: 954,823

[22] Filed: Oct. 1, 1992

Related U.S. Application Data

[62] Division of Ser. No. 696,040, May 6, 1991, Pat. No. 5,174,904.

[51] Int. Cl.$^5$ ............................................... C02F 1/32
[52] U.S. Cl. .................................. 210/205; 210/257.1; 210/220; 422/186.3
[58] Field of Search ............... 210/748, 198.1, 199, 210/205, 917, 928, 257.1, 220, 759; 422/186.3; 250/432 R, 435, 436

[56] References Cited

U.S. PATENT DOCUMENTS

| | | | |
|---|---|---|---|
| 4,336,223 | 6/1982 | Hillman | 210/748 |
| 4,792,407 | 12/1988 | Zeff et al. | 210/748 |
| 4,849,115 | 7/1989 | Cole et al. | 210/748 |
| 5,043,080 | 8/1991 | Cater et al. | 210/748 |
| 5,126,111 | 6/1992 | Al-Ekabi et al. | 210/748 |

FOREIGN PATENT DOCUMENTS

| | | | |
|---|---|---|---|
| 3843679 | 7/1990 | Fed. Rep. of Germany | 210/748 |
| 28883 | 2/1985 | Japan | 210/748 |

Primary Examiner—Stanley S. Silverman
Assistant Examiner—Neil M. McCarthy
Attorney, Agent, or Firm—Evelyn M. Sommer

[57] ABSTRACT

A process and apparatus is provided for removing color from a wastewater stream. The process includes directing the wastewater stream through at least one UV reactor and simultaneously injecting a hydrogen peroxide charge into the wastewater stream exactly at the UV irradiation zone of the reactor. The apparatus of the subject invention includes a UV reactor having a smooth flow channel for wastewater and a zone for exposing the wastewater to UV irradiation. The reactor further includes tubing for directing hydrogen peroxide into the reactor exactly at the UV irradiation zone, such that the hydrogen peroxide is introduced simultaneously to the wastewater stream and the UV irradiation zone.

3 Claims, 1 Drawing Sheet

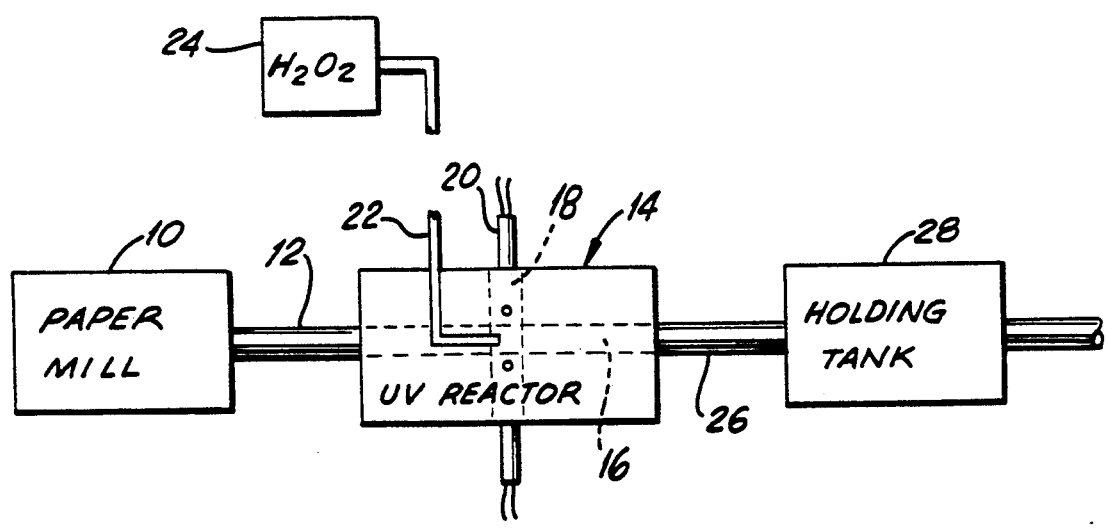

APPARATUS FOR TREATING WASTEWATER

This is a division of application Ser. No. 07/696,040 filed May 6, 1991, now U.S. Pat. No. 5,174,904.

BACKGROUND OF THE INVENTION

Factories that use water during manufacturing processes often produce effluents or wastewater streams that may be unacceptably high in organic contaminants. In particular, paper mills mix water with wood pulp as part of paper manufacturing processes. The resulting effluent or wastewater stream from the mill may include refractory organics and will have a noticeably brown color. There is a need to substantially remove suspended solids and the color from the effluent and to detoxify certain refractory organics.

Various filters are employed in the effluent streams from paper mills and other manufacturing facilities to remove suspended solids from the stream. These prior art filters often will not sufficiently remove color from the effluent stream. In particular, it is desired to remove at least 80% of the color from the effluent stream from a paper mill.

The prior art has attempted to employ hydrogen peroxide, ozone and/or ultraviolet light to oxidize refractory organics in aqueous water streams. For example, U.S. Pat. No. 4,012,321 which issued to Koubek on Mar. 15, 1977 shows a method wherein a predetermined amount of hydrogen peroxide is added under pressure to an aqueous waste stream. The hydrogen peroxide and the aqueous waste stream is thoroughly mixed by an in-line mixer or agitator, and the resultant mixture is subsequently irradiated under ultraviolet light at a wave length no greater than 260 nm.

A similar teaching is shown in U.S. Pat. No. 4,289,728 which issued to Peer et al. on Sep. 15, 1981. U.S. Pat. No. 4,289,728 discloses a method of sterilization in which microorganisms are treated with an ultraviolet irradiated solution of hydrogen peroxide. The method of U.S. Pat. No. 4,289,728 is particularly directed to the sterilization of surfaces of containers. The surfaces are treated with a hydrogen peroxide solution at an elevated temperature, for example, by passing the container through a tank containing the solution or by spraying the walls of the container with the solution. When the container emerges from the hydrogen peroxide treatment, it is then irradiated by ultraviolet light at a wavelength no greater than 325 nm.

Ultrox International of Santa Ana, Calif. has received grants from the State of California, Department of Health Services to study the oxidation of organic contaminants in ground water. Ultrox International reported to the State of California in March 1989 on a process where wastewater was treated with ozone and UV irradiation or with hydrogen peroxide and UV irradiation. The Ultrox report to the State of California clearly illustrated that hydrogen peroxide was added to the ground water being treated before injection of the resulting admixture into a UV reactor. The Ultrox reports to California assert that the hydrogen peroxide, ozone and UV irradiation treatments disclosed therein may generate hydroxyl radicals.

Certain of the Ultrox work is disclosed in patents. In particular, U.S. Pat. No. 4,780,287 issued to Zeff et al. on Oct. 25, 1988. U.S. Pat. No. 4,780,287 is directed to an apparatus containing porous adsorbent beds comprising quartz chips or silica gel wherein contaminated solutions are exposed to ozone and UV irradiation. The disclosure also refers to hydrogen peroxide addition to the contaminated solution prior to injection into the UV reactor.

Ultrox also owns U.S. Pat. No. 4,792,407 which issued to Zeff et al. on Dec. 2, 1987. This reference discloses exposure of ground water to ozone, hydrogen peroxide and UV irradiation.

Ultrox's U.S. Pat. No. 4,849,114 issued on Jul. 18, 1989 and includes a similar disclosure to the above referenced U.S. Pat. No. 4,792,407. However, U.S. Pat. No. 4,849,114 is specifically directed to oxidizing hydrazine and hydrazine derivatives.

It is desired to provide a method and apparatus for decolorization of an effluent stream, and in particular an effluent stream from a paper mill. More particularly, it is desired to provide an apparatus and process for more effectively reducing color of a wastewater effluent stream than is provided by the prior art.

Accordingly, it is an object of the subject invention to provide a method and apparatus for substantially removing color from an effluent stream, and preferably for removing at least 80% of the color.

SUMMARY OF THE INVENTION

The subject invention is directed to a process and an apparatus for removing color from wastewater or effluent. The process and apparatus of the subject invention is particularly effective for treating effluent from a paper mill, and specifically for removing color from the "brown water" effluent from a paper mill.

The process of the subject invention simultaneously subjects the effluent to hydrogen peroxide and UV irradiation. The simultaneous subjection of the effluent to hydrogen peroxide and UV irradiation has been found to achieve superior reduction of color from the "brown water" effluent of a paper mill and to require lower concentrations of hydrogen peroxide than systems injecting hydrogen peroxide into a wastewater stream at a location upstream from the UV irradiation apparatus. The process may further include the step of directing the fluid treated by the hydrogen peroxide and UV irradiation into a holding tank or a holding pond to permit the treated effluent stream to reach equilibrium and to achieve maximum color removal. Effluent streams subjected to this process have been found not to exhibit autoreversability, as in other systems where color could return subsequent to the treatment by hydrogen peroxide and UV irradiation. In accordance with the invention, it is contemplated that in place of the hydrogen peroxide, other oxidants and/or peroxygen chemicals may be utilized.

The subject invention also is directed to an apparatus for injecting hydrogen peroxide into an effluent stream at exactly the same time that the effluent stream enters a UV field. In particular, the apparatus comprises at least one UV reactor with channel means through which the effluent stream may flow. The UV reactor includes at least one UV light source disposed to direct the UV light energy at the effluent stream passing through the reactor. Preferably, the channel means through the UV reactor is formed from or coated with a material that will inhibit accumulation of contaminants. For example, a TEFLON® channel may be employed to prevent build-up of the effluent contaminants onto the walls of the UV reactor.

The UV reactor is further provided with at least one tube extending into the zone of UV radiation for injecting hydrogen peroxide into the effluent stream exactly at the UV radiation zone. The tubing for injection of the hydrogen peroxide preferably is disposed to prevent the hydrogen peroxide from being affected by the UV irradiation prior to mixing with the effluent stream.

BRIEF DESCRIPTION OF THE DRAWING

The FIGURE is a schematic illustration of a wastewater treatment apparatus in accordance with the invention.

DETAILED DESCRIPTION OF THE PREFERRED EMBODIMENTS

A wastewater treatment apparatus in accordance with the subject invention is illustrated schematically in the FIGURE. In particular, a paper mill 10 is provided with an outlet conduit 12 for carrying effluent from the paper mill 10. The conduit 12 of the paper mill 10 may be provided with filtering means (not shown) for removing at least portions of suspended solid materials from the effluent. However, the effluent stream flowing through the conduit 12 will comprise a "brown water" contamination even though an acceptable level of suspended solids have been removed from the effluent stream.

The apparatus of the subject invention comprises a UV reactor which is identified generally by the numeral 14 in the FIGURE and communicates directly with the conduit 12 carrying the "brown water" effluent from the paper mill 10. The UV reactor 14 includes a channel 16 extending therethrough for carrying the "brown water" effluent from the paper mill 10. The channel 16 preferably defines a tube formed from TEFLON ® or a tube coated with TEFLON ®. A portion of the channel 16 defines an irradiation zone 18 which includes a plurality of UV light sources. The number of UV light sources depends upon the cross-sectional area of the channel 16 and the anticipated flow rate of effluent passing through the UV reactor 14. It is to be understood that the illustrated embodiment here is schematic and the actual UV reactor 14 may be adapted from a commercially available reactor as explained further below. It should also be noted that a plurality of UV reactors may be disposed in parallel and/or in series for accommodating the effluent from the conduit 12. In an example described in greater detail below, each UV light source 20 defined an effective arc length of 30.0 inches. Each reactor 14 was capable of delivering thirty thousand $\mu$ W/cm$^2$ UV irradiation at 2537 Angstroms wavelength. Furthermore, each UV reactor employed in the experiments described further below was rated for 40-75 GPM flow capacity.

The UV reactor 14 further includes an injection pipe 22 which communicates with a source of hydrogen peroxide 24. The injection pipe 22 is disposed in the UV reactor 14 to inject hydrogen peroxide exactly at the irradiation zone 18 such that the injection of hydrogen peroxide into the effluent flow occurs exactly as the effluent enters the UV irradiation zone 18. Conduit 26 extends from the UV reactor 14 for receiving the combined flow of effluent and hydrogen peroxide that has been irradiated by the UV light. The conduit 26 extends to a holding tank 28 in which the treated effluent may be retained while reactions are running their course and to enable equilibrium to be reached. In some embodiments, as explained further below, the holding tank may communicate with the conduit 12 upstream of the UV reactor 14 to repeat the exposure of the effluent to irradiation and hydrogen peroxide.

Prior to conducting field tests of the apparatus depicted in the FIGURE, several laboratory experiments were carried out to asses the feasibility and desirability of inserting the hydrogen peroxide exactly at the UV irradiation zone, and to compare this process and apparatus to processes relying exclusively on hydrogen peroxide, exclusively upon UV irradiation or on injection of hydrogen peroxide followed by subsequent UV irradiation. All such laboratory experiments were conducted using a single bench scale TEFLON ® based UV reactor supplied by Hydro System, Inc. of Gastonia, N.C. The UV reactor employed a single G10T5.5L UV lamp and contained a single 1.3 inch diameter TEFLON ® tube. The effective arc length of the UV lamp was 10.9 inches. The bench UV reactor was capable of delivering 550 $\mu$ W/cm$^2$ UV irradiation at 2537 Angstroms wavelength and rated for 1.9 L/min flow capacity. The reactor was piped using Tygon tubing to a 2 liter capacity holding tank and employed a small magnet drive impeller fluid pump rated at 1.5 L/min flow rate.

A thirty-five percent concentration hydrogen peroxide solution that was supplied by FMC Corporation of Princeton, N.J. was delivered to the system in one of several ways. In particular, in some experiments as explained herein measured volumes of peroxide were poured from laboratory glassware directly into the holding tank containing recirculating PINE EO brown water effluent from the bleach plant of a paper mill and then the solution was allowed to pass through the UV field. In some cases the entire hydrogen peroxide charge was added up-front, while in other experiments additional hydrogen peroxide was poured into the holding tank at subsequent times. In still other experiments a drip method was employed as opposed to the above referenced pour method. In the drip method, measured volumes of hydrogen peroxide were allowed to drip from a burette, or other laboratory glassware at a known rate over time into the holding tank containing the recirculating PINE EO effluent, and the mixture was subsequently allowed to pass through the UV field. Typically, a quantity of peroxide was allowed to drip in and mix with the recirculating filtrate prior to activating the UV lamp, with subsequent additions of hydrogen peroxide made while the UV lamp was in operation. A third method involved injection of hydrogen peroxide directly into the recirculating PINE EO at a point inside the UV reactor. In these latter laboratory experiments, which are explained further below, the injection was accomplished via a 60 ml syringe to micro-tubing attached through suitable apparatus to reach a point inside the TEFLON ® tube at a point just inside the UV field. These latter experiments corresponded to the schematic illustration of the FIGURE in that the PINE EO filtrate, the hydrogen peroxide and the UV light combined and reacted simultaneously. In all such experiments, the flow rate through the bench reactor was approximately 1.5 liters per minute.

Each of these experiments was conducted essentially in the following manner. The 2 liter holding tank was initially filled with liter of the PINE EO filtrate. Next, the bench reactor process pump was switched on and the system was allowed to equilibrate for several minutes. A control sample was collected after this equilibration time and prior to the next step.

For all laboratory experiments where hydrogen peroxide was introduced upstream to the UV field, an initial measured quantity of the hydrogen peroxide was introduced into the system by either the pour method or the drip method described above. This was either the full hydrogen peroxide dose for the particular experiment, or an initial quantity, followed by subsequent incremental amounts poured or dripped into the holding tank upstream to the UV reactor as described above. The UV lamp was then switched on an operated on the recirculating mixture for a period of one minute before the first sample was collected. Subsequent hydrogen peroxide additions made after this step, therefore, were made with the UV lamp turned on. For the laboratory experiments where the peroxide was injected directly into the UV field, the UV lamp was switched on and operated on the recirculating mixture for a period of one minute before the first sample was collected and before any hydrogen peroxide had been introduced. In these experiments, the hydrogen peroxide was injected into the flowing PINE EO at a point inside the UV field. The object of these experiments was to deliver the specified amount of hydrogen peroxide substantially evenly over the irradiation time period. Exceptions to this experimental procedure are noted in the footnotes to the tables that follow. The laboratory experiments were carried out with various UV exposure times of from 1 minute to 60 minutes. Samples were collected immediately following the times indicated in the tables. Each sample collected from a laboratory experiment constitutes a unique hydrogen peroxide and UV dose. After the final sample was collected for each laboratory experiment, the system was dumped and exhaustively washed-out using heated tap water followed by a distilled water rinse in preparation for the next series of laboratory experiments.

Field pilot studies were carried out subsequent to the laboratory experiments. The field studies employed two HSI Model 50-LX TEFLON ® based ultra-violet light systems that were supplied by Hydro Systems, Inc. Each UV reactor contained a single 2.3 inch diameter TEFLON ® tube about each of which were arrayed eight G36T6L UV lamps that were encased in directionally focusing parabolic reflectors. The effective arc length of each UV lamp was 30.0 inches. Each reactor was capable of delivering 30,000 $\mu$ W/cm$^2$ UV irradiation at 2537 Angstroms wavelength and rated for 40-75 GPM flow capacity. Reactors were piped in series and skid mounted for the purpose of the field test.

Each UV reactor employed in the field test was fitted with a device for injecting peroxide into the effluent stream at a point just inside the UV field. The injector was fabricated from ⅜ inch diameter, Schedule 10, 304 S.S with other ancillary components and devices. The tube for the hydrogen peroxide was inserted medially and longitudinally to the direction of flow. This disposition assured that the hydrogen peroxide charge does not "see" the UV or the PINE EO effluent until all three components are together simultaneously. Various volumes of hydrogen peroxide supplied at fifty (50%) percent concentration by FMC Corporation were thus delivered to the system for the field test by employing a small pulse-type chemical feed pump. PINE EO filtrate was delivered to the system by a process fluid pump from a 300 gallon holding tank. For each experiment fluid velocity through the UV reactors was adjusted to a flow rate of 50 GPM. Batch experiments were then performed on PINE EO with aliquots removed at appropriate intervals for analysis as described herein. Each batch experiment for the field test was carried out using parameters substantially parallelling those for the laboratory experiments set forth above. In particular, the 300 gallon holding tank was filled to capacity with the PINE EO filtrate. The pilot plant process pump was then switched on and the system was allowed to equilibrate for six minutes. Process control samples were collected after equilibration and prior to the next step. The ultra-violet lamp banks were switched on and operated on the recirculating filtrate for a period of six minutes. This time was required to ensure that the lamps reached their operating temperature and efficiency for maximum UV output. A test sample labeled UV-only was collected at the end of this period and prior to the next step for a further internal control.

A measured quantity of hydrogen peroxide was then introduced into the field test system via the above described chemical feed pump. The pump rate was adjusted such that the entire charge of hydrogen peroxide was delivered equivalently to the UV reactor pair over a six minute period. A sample was collected immediately following injection of all of the hydrogen peroxide charge. The system was then allowed to recirculate in the presence of UV light with no further additions of hydrogen peroxide for an additional 6 minutes. A sample was taken prior to dumping and washing out of the system in preparation for the next field test. In both the laboratory experiments and the field tests, the samples were quantitated for color removal by spectrophotometric analysis at 465 nm wavelength. Absorbencies were measured on unfiltered samples without pH adjustment using either a Milton Roy Model 601 equipped with a 2.5 cm path length quartz cell filled with sample or a Milton Roy Model 1001+ fitted with a 1 cm path length quartz cell. In all cases, the data collected represented apparent color. Also in all cases, the percent color reduction of the treated samples for each experiment were compared to the time Zero batch process controls. All controls and treated samples were stored in the dark to prevent continued photoactivation by incident solar irradiation, and were maintained at constant room temperature.

Turning first to the laboratory experiments, a first series of tests was carried out to determine the individual effect of each of the two components, that is hydrogen peroxide and UV light on the PINE EO filtrate. To test the effects of hydrogen peroxide alone on color removal in PINE EO, 5 ml aliquots of the PINE EO filtrate were dispensed into a series of 20 ml glass screw cap culture tubes. From 1 to 5 ml quantities of hydrogen peroxide, representing hydrogen peroxide concentrations on a 100 wt % basis of 0-35%, was serially pipetted onto the PINE EO and the tube removed to a vortex mixer for 20 seconds. All tubes were incubated in the dark at 25° C. for one hour. Aliquots were removed from each tube in the series and analyzed for apparent color at 465 nm.

TABLE 1

Effect of Peroxide on Color Removal

| SAMPLE NO. | H2O2[b] CHARGE (ml) | % H2O2[c] APPLIED (v/v) | % A[d] @ 465 nm (1 HR) | COLOR[e] REMOVAL (1 HR) | % A @ 465 nm (2 HR) | COLOR REMOVAL (2 HR) | % A @ 465 nm (24 HR) | COLOR REMOVAL (24 HR) |
|---|---|---|---|---|---|---|---|---|
| C[a]   | 0 | 0  | 1.164 | —    | —    | —    | —     | —    |
| DS1-1  | 1 | 7  | .469  | 59.7 | —    | —    | —     | —    |
| DS1-2  | 2 | 14 | .374  | 67.9 | .435 | 62.6 | .979  | 15.9 |
| DS1-3  | 3 | 21 | .327  | 71.9 | .691 | 40.6 | 1.081 | 7.1  |
| DS1-4  | 4 | 28 | .262  | 77.5 | .399 | 65.7 | —     | —    |
| DS1-5  | 5 | 35 | .221  | 81.0 | .421 | 63.8 | —     | —    |

[a]Time 0 Control;
[b]35 wt % H2O2 stock;
[c]% H2O2 applied on 100 wt % basis;
[d]Absorption @ 465 nm using 1 cm pathlength quartz cuvettes;
[e]% Reduction = (In − Out)/In × 100; where In = Time 0 control.

As can be seen from Table 1, a 7% hydrogen peroxide charge resulted in 50% color removal from the PINE EO filtrate after one hour incubation, while a 35% charge resulted in better than 80% color removal. The color change was visible almost immediately, but spectrophotometric analysis was not until one hour after the treatment. During analysis, however, it was observed that the spectrophotometer reading tended to drift upward during the analysis procedure. As a result, the samples were monitored after an additional one hour of incubation. In all cases examined, the two hour reading showed that the color was apparently returning. Two samples were removed for analysis after twenty-four hours of incubation and revealed that color had returned to very nearly the original starting absorbencies. No attempt was made to explain this phenomenon. However, it was concluded that the decolorization caused by hydrogen peroxide alone was auto-reversible.

A second series of laboratory tests was carried out to determine the effect of UV light alone on the PINE EO filtrate. In particular, a 1 liter sample of the PINE EO filtrate was removed to the bench scale UV reactor and subjected to UV irradiation for various time periods as depicted in Table 2 below.

TABLE 2

Effect of UV-Only on Color Removal

| SAMPLE NO. | UV DOSE[b] TIME (min) | TURN-OVERS[c] | % A[d] @ 465 nm (1 HR[f]) | COLOR[e] REMOVAL (1 HR) |
|---|---|---|---|---|
| C[a]    | 0  | 0   | 1.010 | —    |
| DS1-6   | 1  | 1.5 | .938  | 7.1  |
| DS1-7   | 2  | 3   | 1.100 | −8.9 |
| DS1-8   | 5  | 7.5 | 1.274 | −26.1 |
| DS1-9   | 10 | 15  | 1.259 | −24.7 |
| DS1-10  | 30 | 45  | 1.241 | −22.9 |

[a]Time 0 Control
[b]Exposure time of sample to UV irradiation
[c]UV dose time (min) × flow rate (1.5 L/min)
[d]% Absorption @ 465 nm using 1 cm pathlength quartz cuvettes
[e]% Reduction = (In − Out)/In × 100; where In = Time 0 Control
[f]Time post treatment prior to analysis These test data show that low doses of UV light produced a 7.1% color reduction over the untreated controls. However, longer periods of exposure to UV light had a negative effect on color removal, and actually produced color. The mechanism involved by this test was not understood, but appeared to demonstrate that UV light alone would not decolor the PINE EO filtrate.

Laboratory tests were next conducted to determine the effect of adding hydrogen peroxide prior to UV irradiation as in the above described prior art teaching. The initial laboratory experiments in this regard involved pouring the measured amount of hydrogen peroxide into the PINE EO mixture and then subjecting the mixture to UV light. In particular, after the mixture of hydrogen peroxide and PINE EO filtrate had recirculated for 1 minute, UV lamps were switched on and samples were collected over time to determine the percent color removal. These data are presented in Table 3 below.

TABLE 3

Effect of UV Plus Peroxide On Color Removal - High H2O2 Dose Added to PINE EO Prior to UV Irradiation

| EXPERIMENT ID NO. | SAMPLE NO. | UV DOSE[b] TIME (min) | TURN-OVERS[c] | H2O2[d] CHARGE (ml) | % H2O2[e] APPLIED (v/v) | % A[f] @ 465 nm (1 HR)[h] | COLOR[g] REMOVAL (1 HR) | % A @ 465 nm (24 HR) | COLOR REMOVAL (24 HR) |
|---|---|---|---|---|---|---|---|---|---|
| 1 | C[a]    | 0  | 0    | 0   | 0    | 1.161 | —    | —    | —    |
|   | DS1-11  | 35 | 52.5 | 100 | 3.5  | .741  | 38.5 | —    | —    |
| 3 | C[a]    | 0  | 0    | 0   | 0    | 1.001 | —    | —    | —    |
|   | DS1-15  | 0  | 0    | 200 | 7    | .586  | 41.5 | .949 | 5.2  |
|   | DS1-16  | 1  | 1.5  | 0   | 7    | .560  | 44.1 | —    | —    |
|   | DS1-17  | 5  | 7.5  | 0   | 7    | .561  | 44.0 | —    | —    |
|   | DS1-18  | 10 | 15   | 0   | 7    | .554  | 44.7 | —    | —    |
|   | DS1-19  | 30 | 45   | 0   | 7    | .539  | 46.2 | .391 | 60.9 |
| 5 | C[a]    | 0  | 0    | 0   | 0    | 1.050 | —    | —    | —    |
|   | DS1-22  | 0  | 0    | 500 | 17.5 | .465  | 55.7 | —    | —    |
|   | DS1-23  | 1  | 1.5  | 0   | 17.5 | .449  | 57.2 | —    | —    |
|   | DS1-24  | 5  | 7.5  | 0   | 17.5 | .446  | 57.5 | —    | —    |
|   | DS1-25  | 10 | 15   | 0   | 17.5 | .444  | 57.7 | —    | —    |

TABLE 3-continued

Effect of UV Plus Peroxide On Color Removal -
High H2O2 Dose Added to PINE EO Prior to UV Irradiation

| EXPERI- MENT ID NO. | SAMPLE NO. | UV DOSE[b] TIME (min) | TURN- OVERS[c] | H2O2[d] CHARGE (ml) | % H2O2[e] APPLIED (v/v) | % A[f] @ 465 nm (1 HR)[h] | COLOR[g] REMOVAL (1 HR) | % A @ 465 nm (24 HR) | COLOR REMOVAL (24 HR) |
|---|---|---|---|---|---|---|---|---|---|
| | DS1-26 | 30 | 45 | 0 | 17.5 | .302 | 71.2 | — | — |

[a]Time 0 Control
[b]Exposure time of sample to UV irradiation
[c]UV dose time (min) × flow rate (1.5 L/min)
[d]35 wt % H2O2 stock
[e]% H2O2 supplied on 100 wt % basis
[f]% Absorption @ 465 nm using 1 cm pathlength quartz cuvettes
[g]% Reduction = (In − Out)/In × 100; where In = Time 0 Control
[h]Time post treatment prior to analysis
Note: All H2O2 charges delivered to recirculating Pine EO filtrate prior to exposure to UV irradiation.

The experiment summarized in Table 3 involved a 100 ml hydrogen peroxide charge, and resulted in a 38.5% reduction in color after 35 minutes of exposure to the UV light.

A second similar experiment, also summarized in Table 3 doubled the hydrogen peroxide charge, and measured color removal at different periods between 0 and 30 minutes UV exposure to examine the dynamics of the color removal process. This portion of the Table 3 data shows that a 41.5% color removal occurred from the hydrogen peroxide charge alone. After 30 minutes exposure to the UV light, the color removal had reached only 46.2%. Thus, hydrogen peroxide plus subsequent UV irradiation achieved only a 4.7% increase in color removal over hydrogen peroxide alone. As noted above, other experiments with hydrogen peroxide alone had revealed the color removal to be a temporary phenomenon. To further test this phenomenon, the time Zero sample containing only hydrogen peroxide and waste water without exposure to UV irradiation and the 30 minute sample that had been exposed to hydrogen peroxide and subsequently to UV irradiation were retained to determine the effect of post-treatment hold time on color removal. As previously established, the sample subjected only to hydrogen peroxide recovered nearly all of the starting color by 24 hours. On the other hand, the sample subjected to 30 minutes of UV irradiation continued to decolor, ultimately reaching 60.9% color reduction over untreated controls.

The experiments proceeded to assess the effect of massive doses of peroxide on color removal. For these tests, a 500 ml hydrogen peroxide charge was delivered in a manner similar to the preceding experiments. In particular, 500 ml of 35 wt % hydrogen peroxide was poured into the recirculating PINE EO filtrate, and was allowed to mix for 1 minute before exposure to UV light. With this massive dose of hydrogen peroxide, representing a 17.5% dose of hydrogen peroxide applied, the initial effect was only a 55.7% reduction in color to the PINE EO filtrate. After 30 minutes exposure to UV light, the process achieved a 71.2% color reduction compared to untreated controls. Thus, there appeared to be a dependence on hydrogen peroxide dose, and this particular experiment achieved results near the target of 80% color removal. However, the concentration of hydrogen peroxide employed for this experiment was well beyond any reasonable dosage to make commercial application feasible.

Experiments proceeded to determine whether greater color removal could be achieved with lower hydrogen peroxide doses by improving the method of introduction. In particular, peroxide was added upstream to the UV apparatus by employing a large burette and modifying the tip to drip at a maximum rate of 12 ml/minute. The drip rate could be adjusted by rotation of the stopcock, and an attempt was made to deliver evenly over 5 or 10 minutes. These data are presented in Table 4 below.

TABLE 4

Effect of UV Plus Peroxide On Color Removal - Low H2O2 Dose Added to PINE EO
Prior to UV Irradiation With Continuous Drip During Irradiation

| EXPERI- MENT ID NO. | SAMPLE NO. | UV DOSE[b] TIME (min) | TURN- OVERS[c] | H2O2[d] CHARGE (ml) | % H2O2[e] APPLIED (v/v) | % A[f] @ 465 nm (1 HR)[h] | COLOR[g] REMOVAL (1 HR) | % A @ 465 nm (24 HR) | COLOR REMOVAL (24 HR) |
|---|---|---|---|---|---|---|---|---|---|
| 7 | C[a] | 0 | 0 | 0 | 0 | 1.383 | — | — | — |
| | DS2-1 | 0 | 0 | 100 | 3.5 | .820 | 40.7 | — | — |
| | DS2-2 | 1 | 1.5 | 0 | 3.5 | .630 | 54.4 | — | — |
| | DS2-3 | 10 | 15 | 0 | 3.5 | .820 | 40.7 | — | — |
| | DS2-4 | 20 | 30 | 0 | 3.5 | .820 | 40.7 | — | — |
| | DS2-5 | 30 | 45 | 0 | 3.5 | .750 | 45.8 | — | — |
| 6 | C[a] | 0 | 0 | 0 | 0 | 1.077 | — | — | — |
| | DS2-6 | 0 | 0 | 50 | 1.8 | .991 | 8.0 | .991 | 8.0 |
| | DS2-7 | 1 | 1.5 | 0 | 1.8 | .900 | 16.4 | .599 | 44.4 |
| | DS2-8 | 10 | 15 | 0 | 1.8 | .770 | 28.5 | .481 | 55.3 |
| | DS2-9 | 15 | 22.5 | 50 | 3.5 | .770 | 28.5 | .324 | 69.9 |
| | DS2-10 | 20 | 30 | 0 | 3.5 | .770 | 28.5 | .315 | 70.8 |
| | DS2-11 | 30 | 45 | 0 | 3.5 | .650 | 39.6 | .287 | 73.4 |
| 8 | C[a] | 0 | 0 | 0 | 0 | .847 | — | — | — |
| | DS2-27 | 0 | 0 | 50 | 1.8 | .751 | 11.3 | — | — |
| | DS2-28 | 1 | 1.5 | 0 | 1.8 | .670 | 20.9 | .302 | 64.3 |
| | DS2-29 | 5 | 7.5 | 50 | 3.5 | .650 | 23.3 | .345 | 59.3 |
| | DS2-30 | 10 | 15 | 50 | 5.3 | .550 | 35.1 | .388 | 54.2 |
| | DS2-31 | 15 | 22.5 | 0 | 5.3 | .610 | 28.0 | .289 | 65.9 |
| | DS2-32 | 20 | 30 | 50 | 7 | .430 | 49.2 | — | — |

TABLE 4-continued

Effect of UV Plus Peroxide On Color Removal - Low H2O2 Dose Added to PINE EO
Prior to UV Irradiation With Continuous Drip During Irradiation

| EXPERIMENT ID NO. | SAMPLE NO. | UV DOSE[b] TIME (min) | TURN-OVERS[c] | H2O2[d] CHARGE (ml) | % H2O2[e] APPLIED (v/v) | % A[f] @ 465 nm (1 HR)[h] | COLOR[g] REMOVAL (1 HR) | % A @ 465 nm (24 HR) | COLOR REMOVAL (24 HR) |
|---|---|---|---|---|---|---|---|---|---|
| | DS2-33 | 30 | 45 | 0 | 7 | .289 | 65.9 | .193 | 77.2 |

[a]Time 0 Control
[b]Exposure time of sample to UV irradiation
[c]UV dose time (min) × flow rate (1.5 L/min)
[d]35 wt % H2O2 stock
[e]% H2O2 applied on 100 wt % basis
[f]% Absorption @ 465 nm using 1 cm pathlength quartz cuvettes
[g]% Reduction = (In − Out)/In × 100; where In = Time 0 Control
[h]Time post treatment prior to analysis
Note: Peroxide charge added to recirculating PINE EO by dripping the peroxide in with time. All additions made upstream to UV apparatus. Samples DS2-1 through DS2-5 had all peroxide added prior to UV to serve as a process control.

Experiment No. 5 in this Table 4 data set was to establish a control for the pour method. A 100 ml charge of 35 wt % peroxide was poured into the recirculating PINE EO filtrate, and then was exposed to UV irradiation. As before, the hydrogen peroxide alone was demonstrated to remove color, achieving a 40.7% color removal over the untreated control sample. After 30 minutes of UV irradiation, the combined effects of UV plus peroxide had achieved a 45.8% color removal from this PINE EO filtrate sample. These findings were typical and compared favorably to data previously collected and summarized in Table 3 above.

Experiment No. 6 in Table 4 is identified as samples DS2-6 through DS2-11 in Table 4 and employed the drip apparatus and a 100 ml hydrogen peroxide charge. First, 50 mls of the hydrogen peroxide charge was allowed to drip into the recirculating filtrate prior to UV irradiation. This took approximately 5 minutes to accomplish and resulted in a modest 8.0% color removal. Next the UV lamps were switched on and samples were collected at intervals indicated in Table 4 without additional hydrogen peroxide. Table 4 shows that this hydrogen peroxide plus subsequent UV irradiation yielded 28.5% color removal by the 10 minute sample time. The second 50 ml charge of hydrogen peroxide was dripped in upstream to the UV reactor between the 10 minute and 15 minute sample time. This resulted in no additional color removal out to 20 minutes of UV irradiation. By 30 minutes, the combined effect of UV irradiation plus 100 ml of hydrogen peroxide resulted in only a 39.6% reduction in color. Consequently, splitting the hydrogen peroxide charge into two portions and dripping in over time did not produce as good a result as that obtained from dumping all of the hydrogen peroxide charge in at one time. Furthermore, both experiments produced only half the color removal required for a commercial application. These samples were retained on the bench overnight to determine whether additional color removal would occur. As shown in Table 4, decoloration continued. In particular, the 30 minute sample (DS2-11) was measured to achieve a 73.4% color reduction by 24 hours post-treatment.

Experiment No. 6 in Table 4 was repeated using the drip method of hydrogen peroxide addition and a 200 ml hydrogen peroxide charge as had been used in Experiment No. 3, as summarized in Table 3. The results of this drip method and 200 ml charge are presented in Table 4, as Experiment No. 8. These data show a clear advantage to delivering the hydrogen peroxide charge to the system over the experimental time period as opposed to delivering the entire hydrogen peroxide charge into the holding tank prior to UV irradiation. Comparing the 30 minute sample analyzed one hour post-treatment from Experiment No. 8 to the 30 minute sample from experiment no. 3, the data show a 65.9% color removal versus 46.2% color removal. This is a 19.7% advantage for the 200 ml hydrogen peroxide charge. At 24 hours post-treatment, these data were 73.4% and 60.9% respectively. Thus, there appeared to be an advantage to the method of delivery of the hydrogen peroxide charge.

Extreme microfine bubbling was occurring in all samples from Experiment No. 8, thereby making spectrophotometric analysis difficult in that the bubbles would form on the sides of the cuvettes. A technique was developed to obtain reliable results, but the discrepancies between samples DS2-28 through DS2-31 are attributed to interference from these microfine bubbles. Visually, color was removed from these samples. No attempt was made to stop or fix the reaction, and the samples were maintained for observation after an additional 24 hours. At 48 hours post-treatment, the formation of the microfine bubbles had ceased. Analysis of residual peroxide in these samples showed there to be considerable hydrogen peroxide residual at 48 hours.

The laboratory experiments described above established several key points. First, it was concluded that hydrogen peroxide alone was capable of color removal in PINE EO filtrate, but this color removal was temporary and autoreversible. Second, UV irradiation alone was not capable of significant color removal from PINE EO effluent, and in some cases actually added color. Third, the mixture of hydrogen peroxide with PINE EO filtrate followed by subsequent UV irradiation is capable of producing significant and permanent color removal from filtrate. Fourth, there is a difference in ultimate color removal efficiencies effected by the method of hydrogen peroxide introduction. In this regard, massive doses of hydrogen peroxide achieved only limited advantage with respect to color removal. Finally, color removal from the PINE EO filtrate by a process that involves both hydrogen peroxide and UV light irradiation appears to involve a time dependent, autocatalytic reaction sequence.

Additional laboratory experiments were conducted to assess the effect of inserting the hydrogen peroxide exactly at the time the PINE EO filtrate is subjected to UV irradiation. The laboratory system for this purpose employed a 60 ml syringe and micro-tubing fitted inside the TEFLON ® tube of the bench UV reactor. This arrangement allowed for injection of the hydrogen peroxide at a point where all hydrogen peroxide would "see" the wastewater at the same time as both the wastewater and the hydrogen peroxide were exposed to the UV irradiation. All prior experiments and all prior published data employed systems where the hydrogen peroxide was injected into the wastewater or effluent stream prior to UV irradiation. In contrast, this latest experiment provides for a simultaneous exposure of all three components. These data are presented in Table 5 below.

less number which attempts to equalize all experiments with respect to the effectiveness of hydrogen peroxide applied on total color units removed. It should be realized that in all of these bench scale experiments, an excessive amount of hydrogen peroxide was employed. Nevertheless, it can be seen from Table 6 that simultaneous injection of hydrogen peroxide into the waste

TABLE 5

Effect of UV/Peroxide on Color Removal - Simultaneous Addition of H2O2 to PINE EO in UV Flux

| EXPERI-MENT ID NO. | SAMPLE NO. | UV DOSE[b] TIME (min) | TURN-OVERS[c] | H2O2[d] CHARGE (ml) | % H2O2[e] APPLIED (v/v) | % A[f] @ 465 nm (1 HR)[h] | COLOR[g] REMOVAL (1 HR) | % A @ 465 nm (24 HR) | COLOR REMOVAL (24 HR) |
|---|---|---|---|---|---|---|---|---|---|
| 12 | C[a] | 0 | 0 | 0 | 0 | .701 | — | — | — |
|  | DS3-1 | 1 | 1.5 | 0 | 0 | .588 | 16.1 | .418 | 40.4 |
|  | DS3-2 | 2 | 3 | 10 | .4 | .528 | 24.7 | .339 | 51.6 |
|  | DS3-3 | 3 | 4.5 | 10 | .7 | .496 | 29.2 | .259 | 63.1 |
|  | DS3-4 | 5 | 7.5 | 0 | .7 | .469 | 33.1 | .235 | 66.5 |
|  | DS3-5 | 10 | 15 | 10 | 1.1 | .433 | 38.2 | .228 | 67.5 |
|  | DS3-6 | 15 | 22.5 | 0 | 1.1 | .416 | 40.7 | .228 | 67.5 |
|  | DS3-7 | 20 | 30 | 10 | 1.4 | .413 | 41.1 | .186 | 73.5 |
|  | DS3-8 | 30 | 45 | 10 | 1.8 | .376 | 46.4 | .136 | 80.6 |
|  | DS3-10 | 60 | 90 | 10 | 2.1 | .269 | 61.6 | .121 | 82.7 |
| 14 | C[a] | 0 | 0 | 0 | 0 | 1.001 | — | — | — |
|  | DS3-27 | 1 | 1.5 | 30 | 1.1 | .965 | 3.6 | — | — |
|  | DS3-28 | 5 | 7.5 | 0 | 1.1 | .880 | 12.1 | — | — |
|  | DS3-29 | 10 | 15 | 10 | 1.4 | .590 | 41.1 | — | — |
|  | DS3-32 | 30 | 45 | 10 | 1.8 | .395 | 60.5 | .149 | 85.1 |
|  | DS3-34 | 60 | 90 | 10 | 2.1 | .187 | 81.3 | .121 | 87.9 |

As can be seen from Table 5, injecting only 50 ml of 35% hydrogen peroxide directly into the UV irradiation zone resulted in a color reduction after 30 minutes of UV irradiation of 46.4% and 60.5% for samples DS3-8 and DS3-32 respectively. These samples were incubated for 24 hours post-treatment, and continued to decolor, such that samples DS3-8 and DS3-32 achieved 80.6% and 85.1% color reductions respectively. Table 5 also includes data from an additional 10 ml injection of hydrogen peroxide and an additional 30 minutes of exposure to the effects of UV irradiation. Samples DS3-10 and DS3-34 achieved 82.7% and 87.9% color reduction respectively from a total of 60 ml of hydrogen peroxide and 60 minutes of UV irradiation.

The significance of the data presented in Table 5 can be seen from Table 6 below, which compares the color removed in apparent color units (ACU) to the hydrogen peroxide applied (PPM). The ratio in Table 6 is a unitwater flow exactly at the UV field achieved color removal at an ACU/PPM ratio of 2 to 5 times that of methods that had allowed contact of the hydrogen peroxide with wastewater prior to UV irradiation. From these observations and experiments, it was concluded that a pilot scale UV reactor employing a device for simultaneous injection of peroxide could achieve satisfactory color removal at hydrogen peroxide concentrations below 0.10%.

TABLE 6

Relationship of Color Removed to Oxidant Applied (acu:ppm)

| EXPER-IMENT ID NO. | H2O2 APPLICATION METHOD | TYPE H2O2 ADDITION | OXIDANT APPLIED (ppm) | COLOR REMOVED (acu[d]) | COLOR R: OXID APPL (acu:ppm) |
|---|---|---|---|---|---|
| 3 | POUR[a] | PRE | 84000 | 6144 | .073 |
| 6 | DRIP[b] | PRE | 42000 | 7957 | .189 |
| 8 | DRIP[b] | PRE | 84000 | 6587 | .078 |
| 12 | INJECTION[c] | SIM | 21000 | 8763 | .417 |
| 14 | INJECTION[c] | SIM | 21000 | 8582 | .409 |

[a]All peroxide poured into recirculating PINE EO upstream to UV reactor and mixed for 1 min prior to UV lamp being operational.
[b]All peroxide dripped into recirculating PINE EO with time, upstream to UV reactor and mixed for 1 min prior to UV lamps being operational. Subsequent peroxide additions were dripped upstream to the UV reactor but with the UV lamp operational.
[c]All peroxide injected directly into operating UV reactor at a point just inside the reactor where all three components, i.e., UV, peroxide, and PINE EO can react simultaneously.
[d]Apparent Color Units, after 30 min exposure to UV irradiation and 24 hours incubation post treatment.
Note: Peroxide charge was derived from 35 wt % stock.

Table 7 presents the results of field trials that practiced the technology developed in the laboratory and that employ a device as illustrated schematically in the FIGURE. These data indicate that a hydrogen peroxide concentration as low as 0.04% is capable of achieving an average of 78.6% color removal on 300 gallons of PINE EO filtrate with only two full scale UV reactors. Additionally, this pilot plant application achieved a color remove/oxidant applied ratio of 15.86.

TABLE 7

Field Application of UV/Peroxide Technology on Color Removal - Simultaneous Addition of H2O2 to PINE EO in UV Flux

| EXPERIMENT ID NO. | UV DOSE[b] TIME (min) | TURN-OVERS[c] | H2O2[d] CHARGE (ml) | % H2O2[e] APPLIED (v/v) | % A[f] @ 465 nm (1 HR[h]) | COLOR[g] REMOVAL (1 HR) | % A @ 465 nm (24 HR) | COLOR REMOVAL (24 HR) | % A @ 465 nm (48 HR) | COLOR REMOVAL (48 HR) |
|---|---|---|---|---|---|---|---|---|---|---|
| C[a] | 0 | 0 | 0 | 0 | 1.176 | — | — | — | — | — |
| 33 | 6 | 1 | 908 | .04 | .664 | 43.5 | .396 | 66.3 | .185 | 84.3 |
| C[a] | 0 | 0 | 0 | 0 | .892 | — | — | — | — | — |
| 34 | 6 | 1 | 908 | .04 | .646 | 27.6 | .456 | 48.9 | .197 | 77.9 |
| C[a] | 0 | 0 | 0 | 0 | 1.019 | — | — | — | — | — |
| 35 | 6 | 1 | 908 | .04 | .669 | 34.3 | .372 | 63.5 | .172 | 83.1 |
| C[a] | 0 | 0 | 0 | 0 | .920 | — | — | — | — | — |
| 36 | 6 | 1 | 908 | .04 | .628 | 31.7 | .324 | 64.8 | .172 | 81.3 |
| C[a] | 0 | 0 | 0 | 0 | .968 | — | — | — | — | — |
| 36 | 6 | 1 | 908 | .04 | .300 | 69.0 | .291 | .217 | 77.6 | — |
| C[a] | 0 | 0 | 0 | 0 | .738 | — | — | — | — | — |
| 36 | 6 | 1 | 908 | .04 | .386 | 47.7 | .309 | 58.1 | .236 | 68.0 |

[a] Time 0 Control
[b] Exposure time of sample to UV irradiation
[c] UV dose time (min) × flow rate (50 GPM)/Sample volume (300 gal)
[d] 50 wt % H2O2 stock
[e] H2O2 applied on 100 wt % basis.
[f] % Absorption @ 465 nm using 1 cm pathlength quartz cuvettes
[g] % Reduction = (In − Out)/In × 100; where In = Time 0 Control
[h] Time post treatment prior to analysis Note: Pilot plant data collected using 2 ea Model 50LX TEFLON ® based UV reactors supplied by Hydro Systems, Inc., piped in series with H2O2 injectors positioned inside each reactor.
Note: Mean % Reduction for all 6 field experiments @ 0.04% H2O2 concentration = 78.7%.
Note: Mean color removed in Apparent Color Units (acu):Oxidant applied (ppm) ratio for all 6 field experiments = 15.86.
Note: Peroxide feed rate adjusted to apply the total peroxide charge equivalently between both UV reactors and pumped in over a 6 min time period (75.7 ml/min/injector H2O2 flow rate).

In summary, a method and apparatus is provided for injecting hydrogen peroxide or other oxidant and/or peroxygen chemical into a flow of wastewater exactly at the time the wastewater is subjected to UV irradiation. The apparatus and process was found to achieve exceptional color removal from the wastewater stream with acceptable levels of hydrogen peroxide injection and acceptable exposure times to UV irradiation and subsequent holding of the treated filtrates.

I claim:

1. An apparatus for removing the brown color from a paper mill wastewater stream, said apparatus comprising a UV reactor including a flow channel therethrough, said flow channel having a UV irradiation zone, said reactor including UV irradiation means for directing UV irradiation at the wastewater stream as it passes through the UV irradiation zone of the reactor, said apparatus further having injection means extending into the UV irradiation zone for injecting hydrogen peroxide into the wastewater stream exactly at the point where the wastewater stream enters the UV irradiation zone of the reactor so as to simultaneously expose the wastewater stream to the UV irradiation and the hydrogen peroxide.

2. An apparatus as in claim 1 further comprising a holding tank in communication with the reactor for receiving the flow of wastewater and hydrogen peroxide from the reactor.

3. An apparatus as in claim 1 wherein the means for injecting the hydrogen peroxide is adapted to prevent exposure of the hydrogen peroxide to UV light prior to injection of the hydrogen peroxide into the wastewater.

* * * * *

UNITED STATES PATENT AND TRADEMARK OFFICE
CERTIFICATE OF CORRECTION

PATENT NO. : 5,244,570
DATED : September 14, 1993
INVENTOR(S) : J. EDWARD SMITH, II It is certified that error appears in the above—identified patent and that said Letters Patent is hereby corrected as shown below:

Title page, left hand column, delete:

"[73] Assignee: Champion International Corporation, Stamford, Conn."

Signed and Sealed this

Twenty-sixth Day of March, 1996

Attest:

BRUCE LEHMAN

*Attesting Officer*   *Commissioner of Patents and Trademarks*